Sept. 12, 1961     C. H. MILLER     2,999,319
LAYOUT FIXTURE
Filed Nov. 16, 1955     10 Sheets-Sheet 1
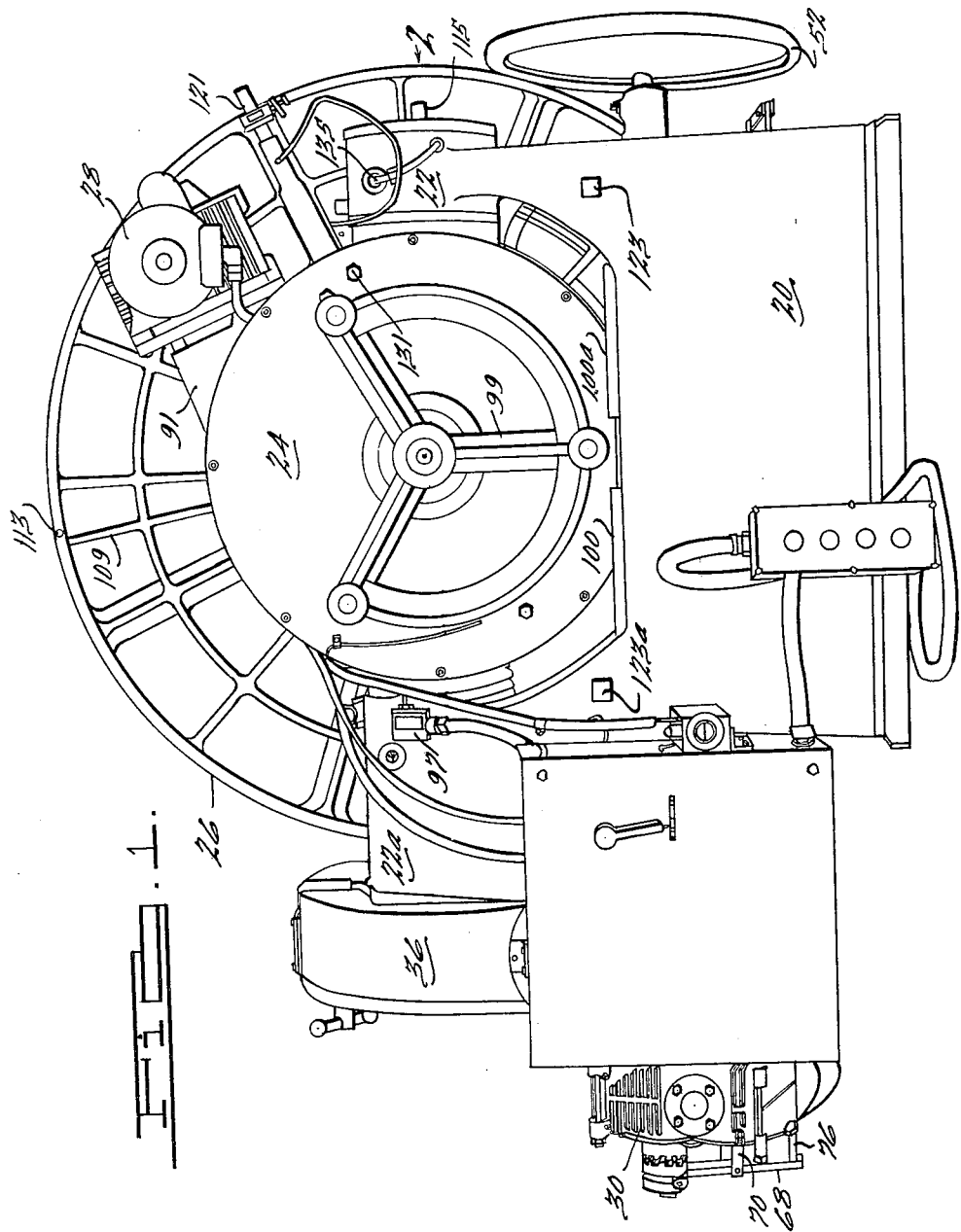
INVENTOR.
*Clarence H. Miller*
BY
*Harness, Dickey & Pierce*
ATTORNEYS

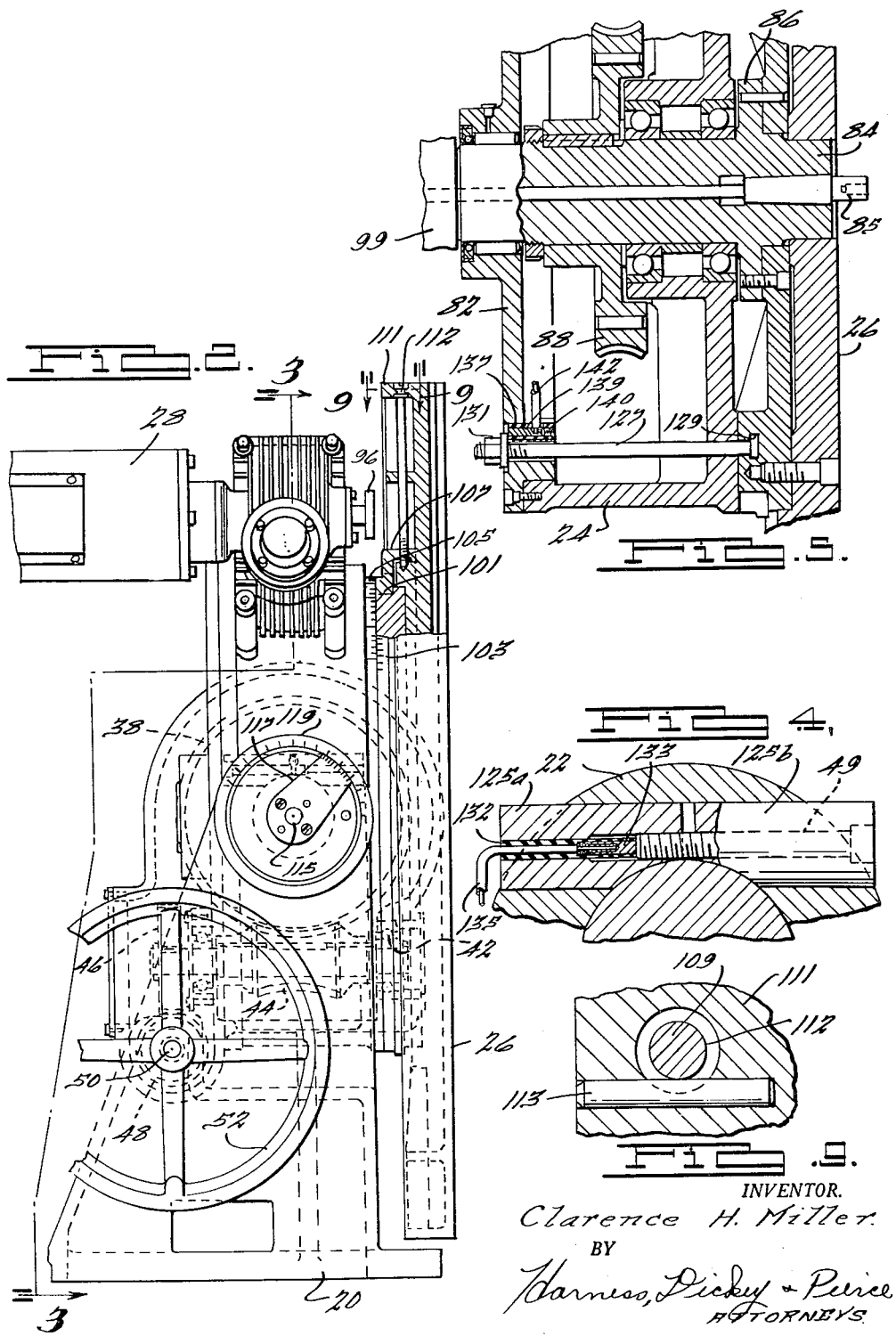

Sept. 12, 1961 C. H. MILLER 2,999,319
LAYOUT FIXTURE
Filed Nov. 16, 1955 10 Sheets-Sheet 3
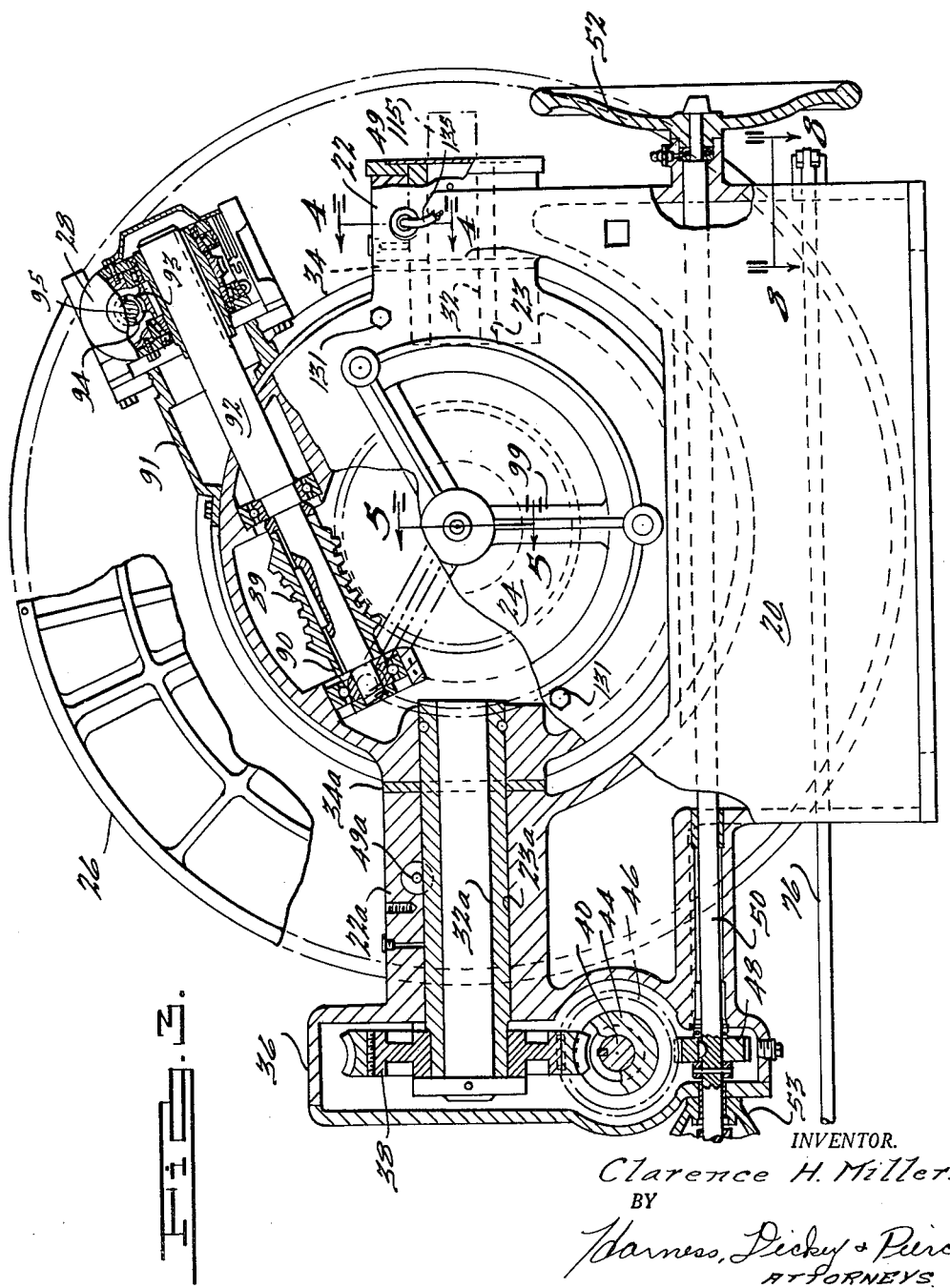
INVENTOR.
Clarence H. Miller.
BY
Harness, Dickey & Pierce
ATTORNEYS.

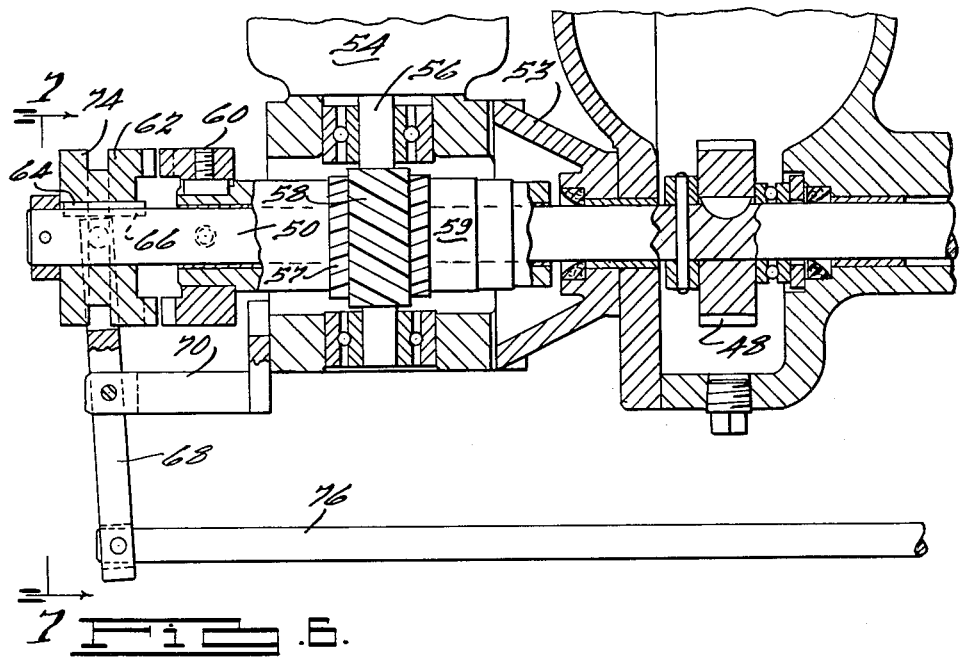
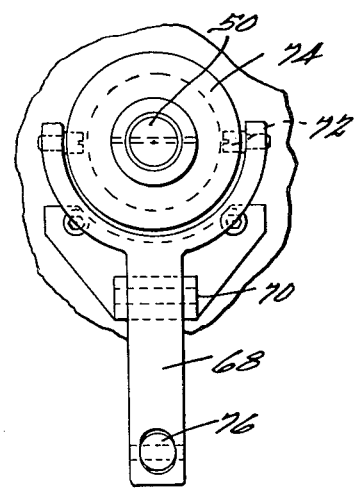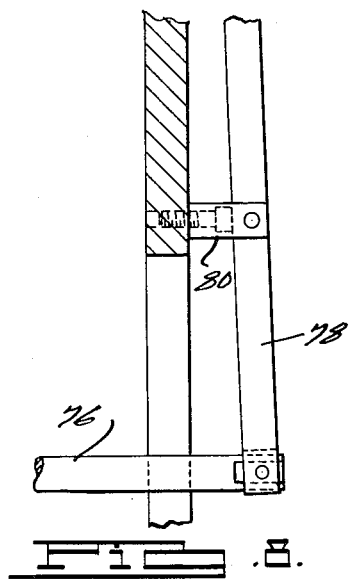

Sept. 12, 1961  C. H. MILLER  2,999,319
LAYOUT FIXTURE
Filed Nov. 16, 1955  10 Sheets-Sheet 5
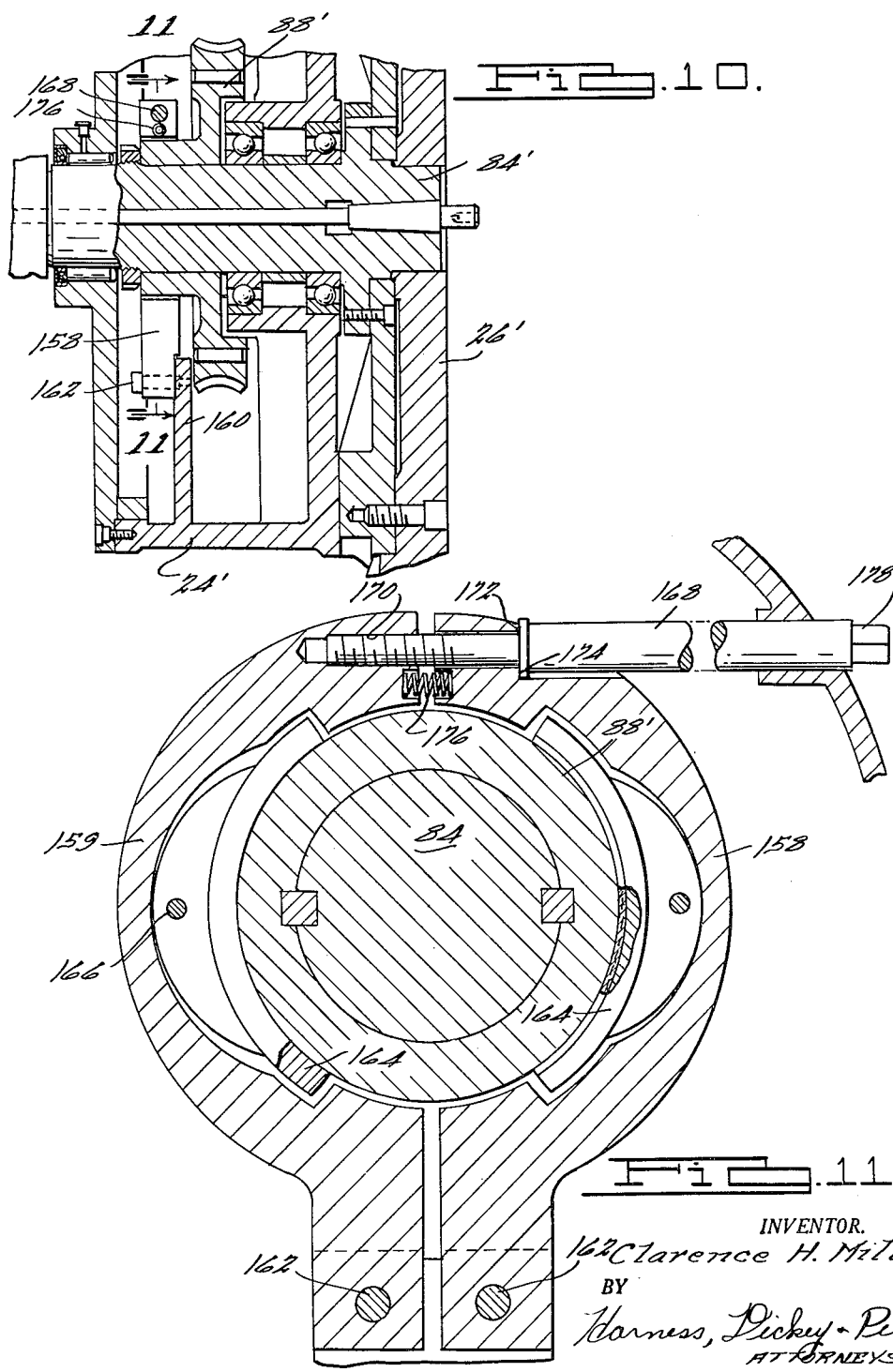
INVENTOR.
Clarence H. Miller
BY
Harness, Dickey & Pierce
ATTORNEYS Sept. 12, 1961    C. H. MILLER    2,999,319
LAYOUT FIXTURE
Filed Nov. 16, 1955    10 Sheets-Sheet 6
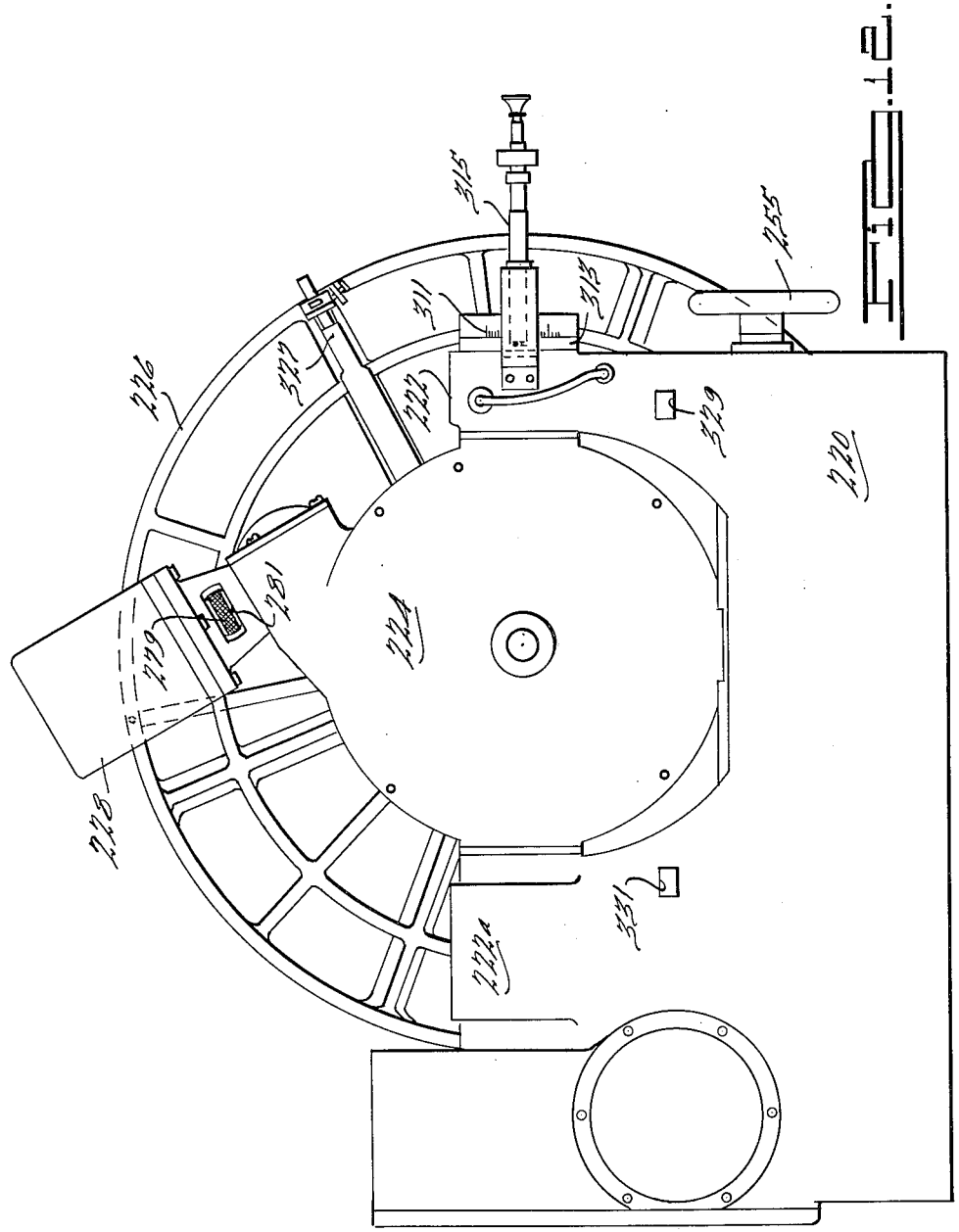
INVENTOR.
Clarence H. Miller
BY
Harness, Dickey & Pierce.
ATTORNEYS

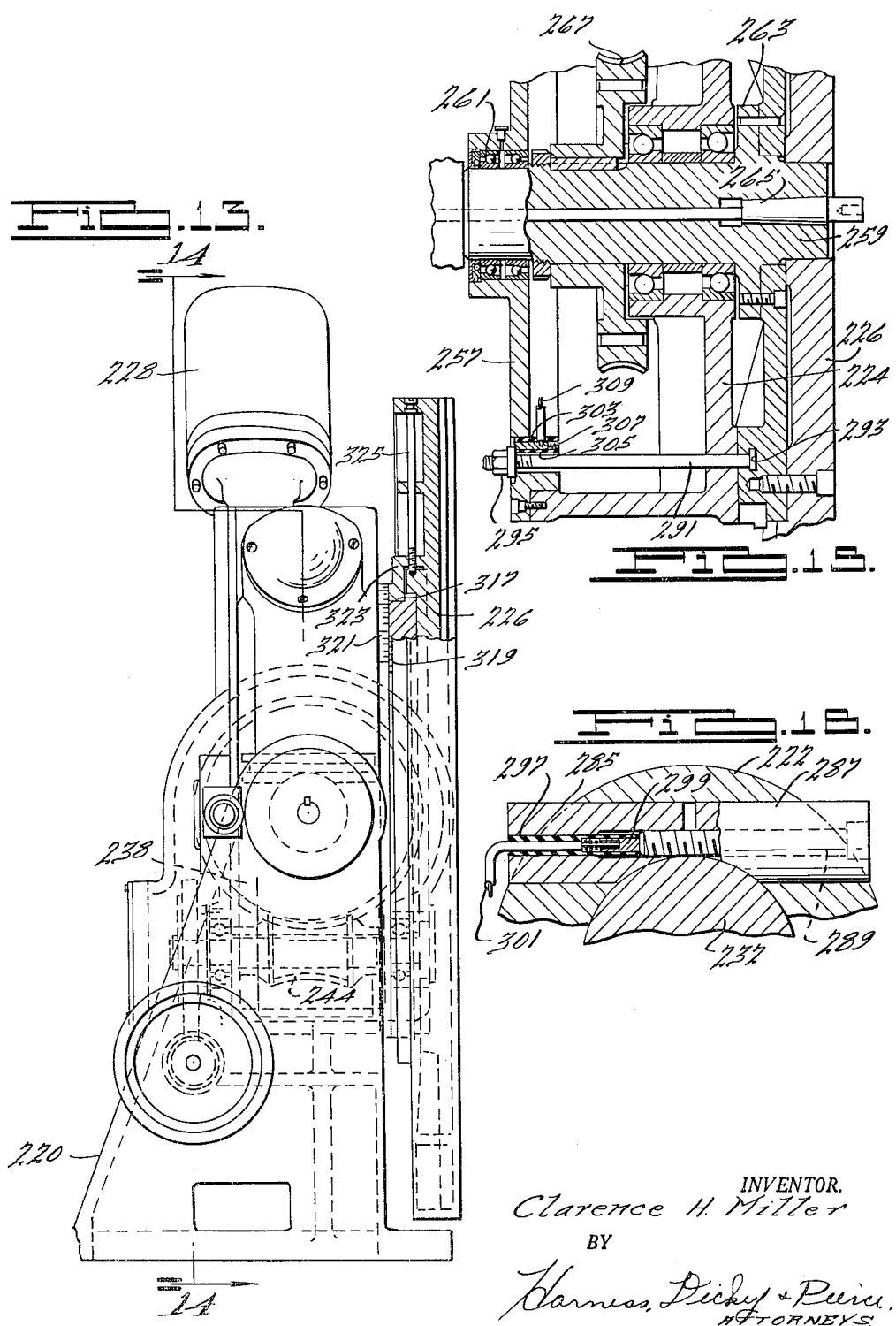

Sept. 12, 1961 C. H. MILLER 2,999,319
LAYOUT FIXTURE
Filed Nov. 16, 1955 10 Sheets-Sheet 8
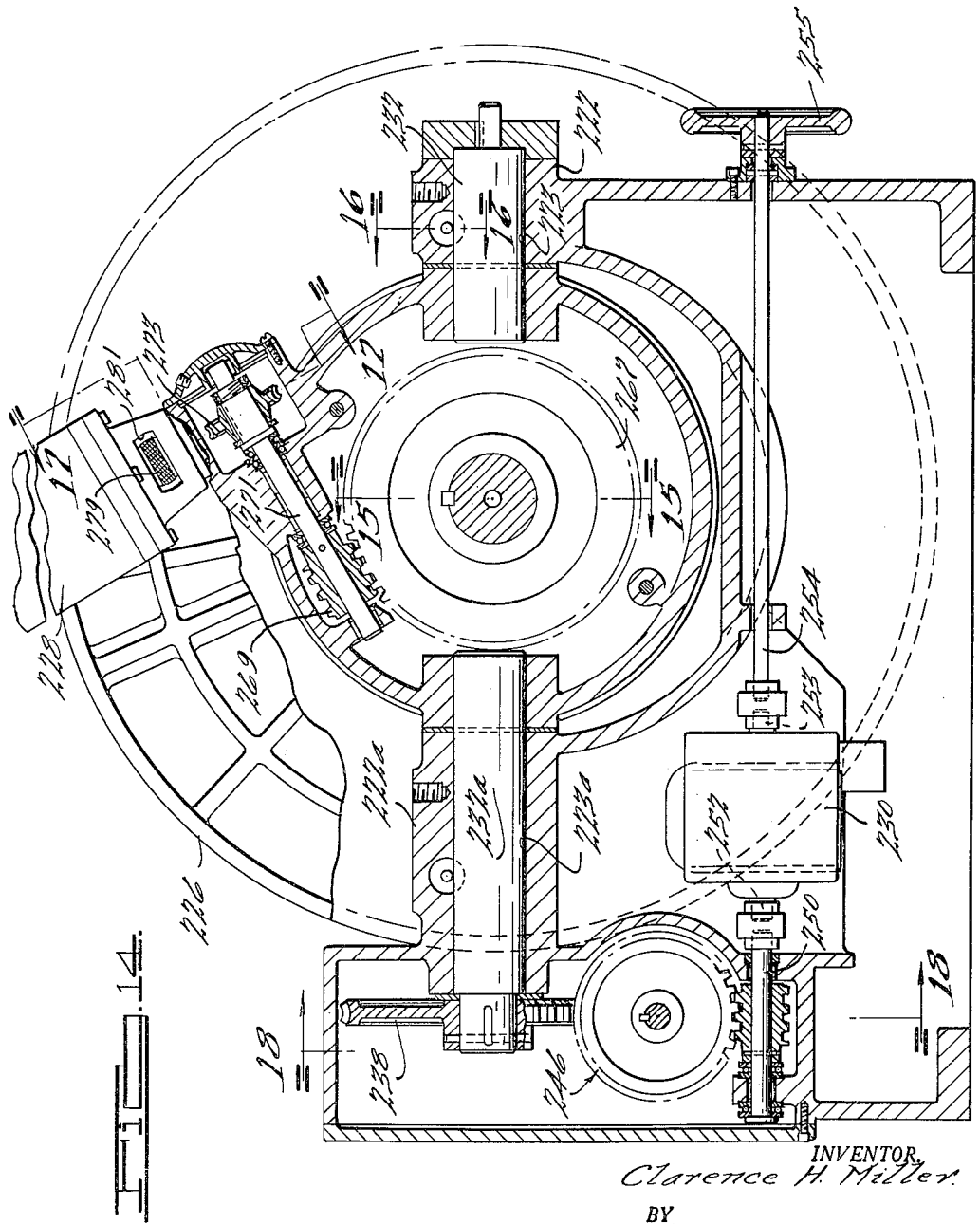
INVENTOR.
Clarence H. Miller.
BY
Harness, Dickey & Pierce
ATTORNEYS

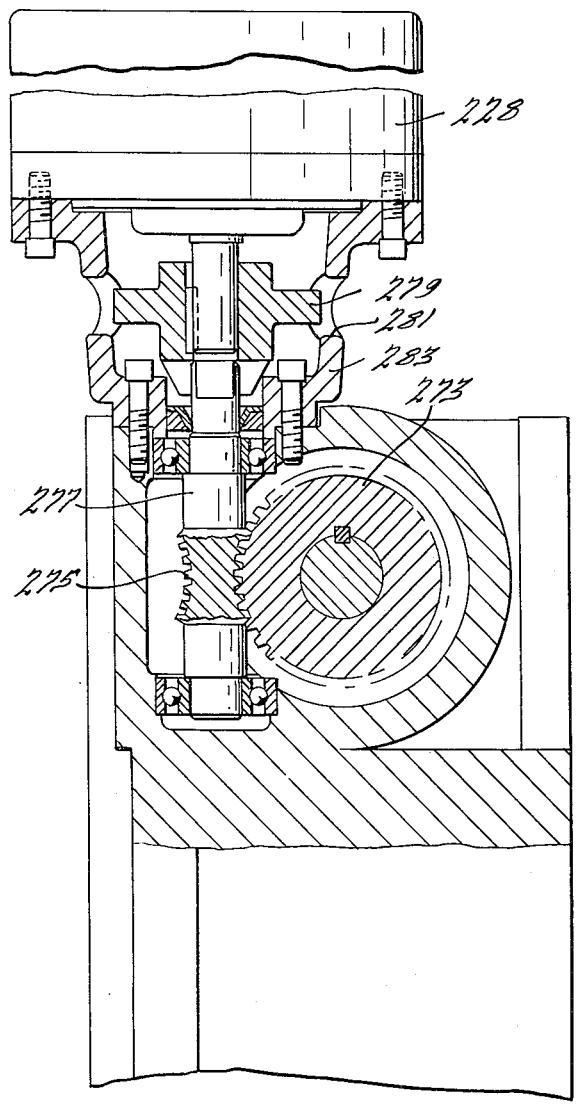

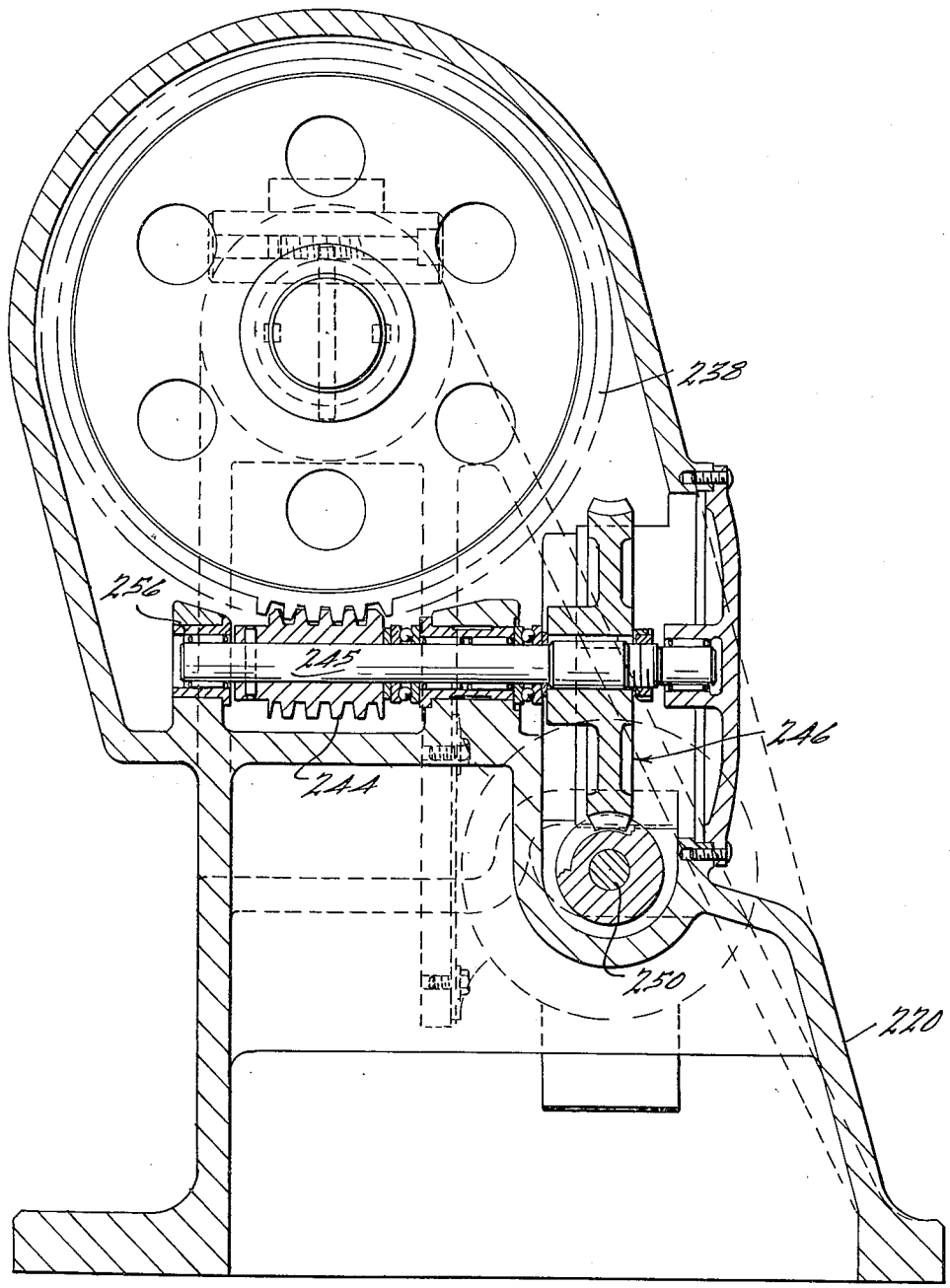

United States Patent Office 2,999,319
Patented Sept. 12, 1961

2,999,319
LAYOUT FIXTURE
Clarence Henry Miller, Detroit, Mich., assignor, by mesne assignments, to Machine Products Corporation, a corporation of Michigan
Filed Nov. 16, 1955, Ser. No. 547,171
3 Claims. (Cl. 33—174)

This invention relates generally to checking devices, and more particularly it relates to a precision layout table and constitutes an improvement of the structure shown in Patent No. 2,380,664 issued to me July 31, 1945, and is a continuation-in-part of my copending application Serial No. 483,003, filed January 20, 1955, entitled, "Layout Fixture" now abandoned.

It is an object of the present invention to provide a layout fixture which may be precisely and finely adjusted to a degree heretofore infeasible.

It is another object of this invention to provide a checking fixture which is of rugged and durable construction and which will not deflect or move while the workpiece is being measured or checked.

It is a further object of my invention to provide a checking device which may be conveniently and rapidly operated, yet which permits fine adjustment for critical measurements.

Other objects and advantages of the present invention will become apparent from the following detailed description taken in conjunction with the accompanying drawings, wherein:

FIGURE 1 is a rear elevational view of a layout fixture embodying the improvements of the present invention;

FIG. 2 is a side elevational view, with parts broken away in section, taken in the direction of the arrow 2 in FIG. 1;

FIG. 3 is a view, partly in section and partly in elevation, taken along the line 3—3 of FIG. 2;

FIG. 4 is a fragmentary sectional view of the structure illustrated in FIG. 3, taken along the line 4—4 thereof;

FIG. 5 is a fragmentary sectional view of the structure illustrated in FIG. 3, taken along the line 5—5 thereof;

FIG. 6 is a fragmentary sectional view of the clutch, clutch linkage, and power means of the present invention, as partially shown in the lower left-hand corner of FIG. 3;

FIG. 7 is an end elevational view of the structure illustrated in FIG. 6, looking in the direction of the arrows;

FIG. 8 is a sectional view, taken along the line 8—8 of FIG. 3, showing parts in elevation;

FIG. 9 is a fragmentary sectional view of the structure illustrated in FIG. 2, taken along the line 9—9 thereof;

FIG. 10 is a fragmentary sectional view similar to FIG. 5, illustrating a further embodiment of the invention;

FIG. 11 is an enlarged fragmentary sectional view of the structure illustrated in FIG. 10, taken along the line 11—11 thereof;

FIG. 12 is a rear elevational view of a further embodiment of a layout fixture of this invention;

FIG. 13 is a side elevational view of parts broken away in section of the structure illustrated in FIG. 12;

FIG. 14 is a view partly in section and partly in elevation, taken along the line 14—14 of FIG. 13;

FIG. 15 is a sectional view of the structure illustrated in FIG. 14, taken along the line 15—15 thereof;

FIG. 16 is a sectional view of the structure illustrated in FIG. 14, taken along the line 16—16 thereof;

FIG. 17 is an enlarged sectional view of the structure illustrated in FIG. 14, taken along the line 17—17 thereof; and FIG. 18 is an enlarged sectional view of the structure illustrated in FIG. 14, taken along the line 18—18 thereof.

In the embodiment of the invention illustrated, it may be seen that the apparatus includes a heavy cast base member 20 which forms the supporting structure for the working parts of the fixture. The base member 20 is provided with two upwardly extending yoke portions 22 and 22a having axially aligned recesses 23 and 23a, between which a table support member 24 is trunnioned. The table support member 24 rotatably supports a circular table 26 on which the parts to be measured are placed, the face of the table 26 being parallel to the axis of rotation of support member 24. A part secured to the table 26 may thus be moved through angles lying on two perpendicular planes by rotating the table 26 and the table support member 24 about their axes. The table 26 and the table support member 24 may be rotated either manually or by the activation of electric motors 28 and 30 which are geared to the table 26 and table support member 24, respectively, by means to be hereinafter described. Sets of scales, to be described hereinafter, are mounted on the table and table support member so that the degree of movement of both the table and table support member may be measured.

Trunnions 32 and 32a, extending from either side of the table support member 24, are journalled for rotation in the axially aligned recesses 23 and 23a. Thrust bearing washers 34 and 34a are disposed on either side of the table support member 24, providing a smooth working surface between the table support member 24 and yoke portions 22 and 22a. Located outwardly from the bearing surface of the left-hand yoke portion 22a, as shown in FIG. 3, is a gear housing 36. Located within this housing is a large worm wheel 38 fast on the end of the left-hand trunnion 32a. Below the worm wheel 38 a shaft 40 is rotatably supported in bearings 42 (FIG. 2) in a plane perpendicular to the trunnions 32. A worm 44 is fast on the center of the shaft 40 so as to engage and drive the worm wheel 38. Fast on the rear end of the shaft 40 is a helical gear 46 adapted to be driven by a matching helical gear 48. The gear 48 is fast on a driveshaft 50 which extends the entire width of the fixture and is rotatably supported in the base member 20. Still looking at FIG. 3, a hand wheel 52 is fast on the right-hand end of the driveshaft 50 so that the gear 48 may be driven by the rotation of this wheel. The rotation of the gear 48 will cause the rotation of the shaft 40 and thus the movement of the entire table support member 24 about its rotative axis.

The motor 30 may also be used to drive the gear 48, as is shown in more detail in FIG. 6. A flange 53 supports a speed reducer, generally indicated at 54, on the left-hand end of the base member 20, and the motor 30 is geared to the speed reducer 54 by any suitable means. The speed reducer 54 is provided with a worm 58 mounted on a shaft 56, which drives a worm wheel 57 fixedly mounted on a sleeve 59 through which the drive shaft 50 extends. An inner clutch plate 60 is fast on the outer end of the sleeve 59 and is adapted to engage an outer dog clutch plate 62 slidably keyed on the end of the shaft 50. Thus the clutch member 62 is longitudinally slidable along the shaft 50 but is held against any axial movement with respect thereto. A clutch operating lever 68 is pivotally mounted on a bracket 70 which in turn is rigidly secured to the speed reducer 54. The upper end of the lever 68 is bifurcated and the opposed legs carry inwardly extending pins 72 which are disposed within an annular groove 74 recessed around the periphery of the clutch plate 62. By this means, the clutch 62 is rotatable with respect to the lever 68, but the lever 68 may be used to move it along the shaft 50 in and out of engagement with the inner clutch plate 60. The lever 68 is pivotally connected to its bottom portion with a rod 76 which runs substantially parallel to the driveshaft 50 along the entire width of the fixture and beyond the cast base member 20. A lever arm 78 is pivotally connected at one end thereof to the other end of the rod 76 in an exposed position near the hand wheel 52 and its other end is free. The center of the lever arm 78 is pivotally secured to a member 80 so that the backward and forward manipulation of the free end of the lever arm 78 will longitudinally move the rod 76 and pivot the lever 68 so as to cause the engagement or disengagement of the clutch plates 62 and 60. It may be seen that when the clutch plates 62 and 60 are engaged, the activation of the motor 30 will cause the rotation of the sleeve 58 and clutch plate 60 and thus the rotation of clutch plate 62 and shaft 50. When the ctluch plates 62 and 60 are disengaged, the drive shaft 50 may easily be turned by means of the hand wheel 52. In actual practice the motor 30 is used to turn the table any appreciable distance, and the hand wheel 52 is utilized for fine adjustment.

Referring now to FIG. 5, the manner in which the table 26 is supported by the table support member 24 may easily be seen. The table support member 24 is closed at its back end by a cover plate 82 and is provided at its forward surface with a recess within which a heavy stub shaft 84 is journalled for rotation. The shaft 84 is provided with an annular shoulder 86 near the forward portion thereof, to which the table 26 is secured. A spindle 85 extends through the shaft 84 and projects from both the forward and rearward ends thereof. A large worm wheel 88 is fast on the rearward portion of shaft 84 and is adapted to be driven by a worm 89, as shown in FIG. 3. Worm 89 is fast on a shaft 90 which is journalled for rotation in the upper periphery of the table support member 24.

Journalled in a housing 91 on the upper periphery of the table support 24 is a shaft 92 coaxial and integral with the shaft 90. The end of the shaft 92, remote from the shaft 90, carries a worm wheel 93 integral therewith. Drivably engaging the worm wheel 93 is a worm 94 carried on a shaft 95 which is keyed to the drive shaft of motor 28. Motor 28 is fixedly mounted on the housing 91 and, through the gearing described above, operates to rotate the table 26. The worm 94 and worm wheel 93 function as a speed reducer, permitting the use of a small motor and more gradual movement of the table. An adjusting knob 96, integrally mounted on the end of shaft 95 remote from the motor 28, permits extremely fine movement of the table by hand.

In order to prevent the motor 30 from running after the table support member 24 has reached the end of its movement, limit switches are mounted on the base, as at 97 (FIG. 1). The switch 97 is tripped by the supporting member 24 when the table reaches a horizontal position, so as to stop the motor 30. This prevents the motor from burning out or injuring the other parts of the machine.

Both the table support member 24 and the table 26 are provided with locking screws or bolts in order to lock them in any desired position while a measurement is made. The right-hand yoke 22 of the base hase two aligned internally threaded blocks 125a and 125b fixedly mounted therein on opposite sides of the trunnion 23. Lock screw 49 is threaded into the blocks and when tightened clamps the blocks on the trunnion and prevents it, and thus the entire table support member 24, from turning (see FIG. 4). The table 26 may be locked against movement by means of a T head bolt 127 which extends through the table support member 24 and has its head slidably disposed in an annular recess 129, having a T-shaped cross-sectional shape, formed in the rear face of the table structure. The recess 129 is concentric with shaft 84 so the table may freely turn while the head of the bolt 127 remains stationary in the recess 129. When nut 131, threaded on the end of bolt 127, is tightened, the head of the bolt tightens against the inside wall of the recess 129 and clamps the table 26 in a fixed position.

Both of the above described locking units are provided with similar safety devices which are electrically interconnected to the motors 28 and 30 and which serve to prevent the inadvertent operation of the motors when the table and table support are locked in position.

FIG. 4 illustrates the electrical connection associated with the locking screw 49 used to lock the table support member 24 in position. Mounted within the block 125a and extending into the end of the threaded aperture thereof is a sleeve 132 formed of any suitable insulating material. Supported in one end of the sleeve 132 so as to be engageable by the end of the screw 49 when it is tightened, is a brass plug 133. A wire 135 extends through the sleeve 132 and is connected to the plug 133. The wire 135 leads to any suitable relay (not shown) which is interconnected in the circuit carrying current to the motor 30. As the screw 49 is tightened, it moves into contact with the plug 133 which completes a circuit to the aforementioned relay. The actuation of the relay prevents the flow of current to the motor and assures that it may not be inadvertently operated while the table support member is locked in position.

FIG. 5 illustrates the connection associated with the bolt 127 and nut 131. An insulating sleeve 137 is mounted in the table support member 24 adjacent the bolt 127. A brass plug 139 is supported in the sleeve 137 so as to engage the bolt 127 when it is tightened. The plug 139 is resiliently loaded by a spring 140, and wire conduit 142 is connected with the plug and with a relay (not shown). The contact of the nut 131 with the plug completes a circuit flowing through the relay to prevent the energization of motor 28 as was described above.

The rear end of the spindle 85 projects through the cover plate 82 and a sine bar 99 is mounted fast thereon. The sine bar 99, rotating mutually with the table 26, can be used to check its angular movement. The sine bar may have a plurality of arms to permit accurate measurement of the bar through an entire 360° rotation, or it may have a single arm or be of the 90° type. Finished horizontal blocks (FIG. 1) 100 and 100a are mounted on the base 20 below the spindle 85, forming a level support upon which Johansson gauge blocks may be placed in order to measure the movement of the sine bar.

The table 26 is provided with an annular shoulder 101 on its underside or back face. Mounted on the shoulder 101 is an annular scale 103. The scale 103 fits the shoulder 101 snugly but is still slidable therearound. Directly opposite the scale 103 is another scale 105 affixed to the outer circumferential periphery of the table support member 24. At any time the scale 103 may be secured at its zero position with respect to the scale 105 by means of clamp 107. Clamp 107 is caused to bear downwardly on the annular scale 103 by means of an elongated screw 109 threaded into the clamp 107 and extending into the circumferential periphery 111 of the table 26. Screw 109 is rotatably supported in the peripheral wall 111, as is shown in FIG. 9. An annular groove 112 is recessed in the screw 109 adjacent the end thereof and a pin 113 is securely positioned tangentially to the screw withing the groove 112. This serves to hold the screw 109 against longitudinal movement but permits the rotation of the screw 109 so as to thread the screw into the clamp 107, thereby compressing it downwardly on the scale 103. By this means, the ring 103 may be secured in any desired position on the shoulder 101 and as the table 26 is rotated reference may be had to the scales 103 and 105 for determining the degree of rotation thereof.

A spindle 115 set in the trunnion 32 projects outwardly therefrom beyond the face of the yoke portion 22 and is secured to the trunnion 32 so as to rotate therewith. Fast on the end of the spindle 115 is a scaled indicator 117. Cooperating with the indicator 117 in order to measure the angular movement of the table support member 24 is an annular scale 119 affixed to the end of the yoke portion 22. As the table member 24 is moved, the indicator 117 will move accordingly. This movement is readily measurable on the scale 119.

Under ordinary circumstances, an operator of a checking fixture is capable of reading the graduations on several scales to determine the angular movement to the nearest minute of a degree. Under many circumstances this is not a sufficiently fine measurement. The scales 103 and 105, being removed from the periphery of the table 26, are somewhat inaccessible for close examination. Furthermore, the normal limitations of an operator's eyesight prevent extremely accurate readings. In order to remedy this situation, a microscope 121 has been mounted on the base member 24 by which it is possible to read scales 103 and 105 to within three seconds of a degree. The microscope is set to view a one degree area on the scale 103. The small graduations between each degree, which have been diamond cut, may then be read.

Hardened blocks 123 and 123a are mounted on either side of the base member 20 so as to project therefrom. Measurements may be taken between the blocks 123 and 123a and the surface on which the machine rests so as to determine that the machine is absolutely level before any checking operations are performed.

In cases where the machine is relatively large, it has been found desirable to provide a more rugged and positive means of locking the table against rotation, than that previously illustrated. Therefore, in the embodiment of the invention illustrated in FIGS. 10 and 11, a different table-locking mechanism is illustrated. However, as the remainder of this larger machine is substantially identical to that previously described, primed reference numerals will be used in this embodiment to designate parts substantially identical to the parts previously described and referred to. In this embodiment, the bolt type clamp arrangement is replaced by a friction brake device for preventing rotation of the table 26' relative to the table support 24'. A pair of brake shoes 158 and 159 are disposed within the table support 24' and pivotally supported on a web 160 within the confines of the table support by means of pivot pins 162 which are threadably connected with the web 160. The brake shoes 158 and 159 are, therefore, pivotable about pivot pins 162 to open and close relative to the shank portion of the gear 88'. As can be clearly seen, the gear 88' is keyed to the shaft 84' and the shaft is journalled on the table support 24' by suitable bearings. Each brake shoe carries an inner shoe 164, which may have a friction lining connected thereto, and each inner shoe is pivotally connected at 166 with its respective outer shoe so that its inner face is adapted to properly engage the shank portion of the gear 88'. In order to tighten the brake against the gear 88' and thus prevent rotation of the table relative to the table support, a stud 168 is provided, the inner end of which is threadably connected with brake shoe 159 at 170. The stud is provided with an intermediate shoulder 172 which engages a shoulder 174 on brake shoe 158 so that when the stud 168 is threaded into the brake shoe 159, the two brake shoes will be drawn toward each other. A coil spring 176 is provided between the brake shoes to yieldably urge the same apart. The stud 168 extends through and is journalled in the peripheral wall of the table support 24' and a square or hexagonal head 178 is provided on the outer end of the stud so that the stud may be easily threaded into or out of the brake shoes to thereby clamp the table 26' against rotation, or release it for rotation. Suitable means for preventing operation of the table drive motor may also be provided in the same manner as previously described. It will thus be appreciated that in large machines, this brake arrangement provides a more positive clamping mechanism to prevent rotation of the table than the clamp illustrated in the previous embodiment.

In the embodiment of the invention shown in FIGS. 12 through 18, the apparatus includes a heavy cast base member 220 which forms the supporting structure for the working parts of the fixture. Base member 220 is provided with two upwardly extending yoke portions 222 and 222a having axially aligned openings 223 and 223a between which a table support member 224 is trunnioned. The table support member 224 rotatably supports a circular table 226 on which the parts to be measured are placed, the face of said table 226 being parallel to the axis of rotation of support member 224. A part secured to the table 226 may thus be moved through angles lying on two perpendicular planes by rotating the table 226 and the table support member 224 about their axes. The table 226 and the table support member 224 may be rotated either manually or by activation of electric motors 228 and 230 which are geared to the table and table support member by means to be hereinafter described. Sets of scales, to be hereinafter described, are mounted on the table and table support member, as well as on the base and table support member so that the degree of movement of both the table and the table support member about their rotative axes may be measured.

Trunnions 232 and 232a extending from either side of the table support member 224 are journalled for rotation in the axially aligned openings 223 and 223a. Located within a housing portion of the base of the machine outwardly of the yoke portion 222a, as shown in FIG. 14, is a large worm wheel 238 which is fastened on the end of the left-hand trunnion 232a. Worm wheel 238 meshes with a worm 244 on a shaft 245 supported within the base of the machine and forming a portion of a gear reduction unit 246. The drive shaft 250 of the gear reduction unit is connected with the output shaft 252 of the motor 230 which is supported within the base below the trunnion 232a. The input shaft 253 of the motor 230 is connected with a shaft 254 which extends transversely across the bottom of the base and is rotatably supported therein, and carries a hand wheel 255 on the outer end thereof which can be rotated so as to manually cause rotation of the speed reduction unit through driveshaft 250. Whether the speed reduction unit driveshaft 250 is driven by the motor 230 or the hand wheel 255, the worm wheel 238 will be rotated so as to cause the table support member 224 to rotate about its longitudinal axis. The shaft 245 is supported on the base by means of eccentric bushings 256 which can be adjusted so as to take out or remove any backlash in the gear system, thus providing for a much more accurately controlled drive mechanism.

Referring now to FIG. 15, the manner in which the table 226 is supported by the table support member 224 may be easily seen. The table support member 224 is closed at its back end by a cover plate 257 and is provided at its forward end with a recess within which a heavy stub shaft 259 is journalled for rotation. The stub shaft 259 is journalled in the cover 257 by suitable back-to-back radial thrust bearings 261. The shaft 259 is provided with an annular shoulder 263 near the forward portion thereof to which the table 226 is secured. A spindle 265 extends through the shaft 259 and projects from both the forward and rearward ends thereof. A large worm wheel 267 is connected to the rear portion of the shaft 259 and is adapted to be driven by a worm 269 illustrated in FIG. 14. Worm 269 is supported on a shaft 271 which is journalled for rotation in the table support member 224 by suitable means, such as eccentric bushings, which may be adjusted to remove backlash from the gear system.

A worm wheel 273 is keyed to the shaft 271 adjacent the opposite end thereof from the worm 269 and the worm wheel 273 meshes with a worm 275 on a shaft 277 rotatably supported on the table support member 224 and drivably connected with the motor 228. This gearing arrangement functions as a speed reducer, permitting the use of a smaller motor and more gradual movement of the table. A knurled adjusting knob 279 is keyed to the shaft 277 and is accessible through an aperture 281 in housing member 283 on which the motor 228 is supported. The adjusting knob 279 permits an operator to make extremely fine adjustments or movements of the table by hand.

In order to prevent the motor 230 from running after the table support member 224 has reached the end of its movement, suitable limit switches may be provided on the base which are adapted to be tripped when the table reaches a predetermined position so as to stop the motor. This prevents the motor from burning out or injuring other parts of the machine. Both the table support member 224 and the table 226 are provided with locking screws or bolts in order to lock them in any desired position while a measurement is made. The right-hand yoke 222 of the base has two aligned internally threaded blocks 285 and 287 fixedly mounted therein on opposite sides of the trunnion 223. A lock screw 289 is threaded into the blocks, and when tightened, clamps the blocks on the trunnion and prevents it, and thus the entire table support member 224, from turning. The table 226 may be locked against movement by means of a T-headed bolt 291 which extends through the table support member 224 and has its head slidably disposed in an annular recess 293, having a T-shaped cross-section, formed in the rear face of the table structure. The recess 293 is concentric with shaft 259 so that the table may freely turn while the head of the bolt 291 remains stationary in the recess 293. When nut 295, threaded on the end of the bolt 291, is tightened, the head of the bolt tightens against the inside wall of the recess 293 and clamps the table 226 in a fixed position. Both of the above-described locking units are provided with similar safety devices which are electrically interconnected with the motors 228 and 230 and which serve to prevent the inadvertent operation of the motors when the table and table support member are locked in position.

FIG. 16 illustrates an electrical connection associated with the locking screw 289 used to lock the table support member 224 in position. Mounted within the block 285 and extending into the end of the threaded aperture thereof is a sleeve 297 formed of any suitable insulating material. Supported in one end of the sleeve 297 so as to be engageable by the end of the screw 289 when it is tightened is a brass plug 299. A wire 301 extends through the sleeve 297 and is connected to the plug 299. The wire 301 leads to any suitable relay (not shown) which is interconnected with the circuit carrying current to the motor 230. As the screw 289 is tightened it moves into contact with the plug 299 which completes a circuit to the aforementioned relay. The actuation of the relay prevents the flow of current to the motor and assures that it may not be inadvertently operated while the table support member is locked in position.

FIG. 15 illustrates the connection associated with the bolt 291 and nut 295. An insulating sleeve 303 is mounted in the table support member 224 adjacent the bolt 291. A brass plug 305 is supported in the sleeve 303 so as to engage the bolt 291 when it is tightened up. The plug 305 is resiliently loaded by spring 307, and a wire conduit 309 is connected with the plug and with a relay (not shown). The contact of the nut 295 with the plug completes a circuit flowing from the relay to prevent the energization of motor 228 as was described above.

While in the previous embodiments an indicator arm 117 was provided to permit accurate measurements of the angular position of the table support member, in this embodiment a scale 311 is provided on the end of trunnion 232, while a vernier scale 313 is provided on the yoke 222. A microscope 315 is fixedly connected to the yoke so that both the vernier and main scales 313 and 311, respectively, can be viewed, thus permitting the scales to be read down to seconds and thereby eliminating the need for any sine bar for measuring the degree of rotation of the table support member 224. The table 226 is provided with an annular shoulder 317 on its underside or back face. Mounted on the shoulder 317 is an annular scale 319. The scale 319 fits the shoulder 317 snugly but is still slidable therearound. Directly opposite the scale 319 is another scale 321 affixed to the outer periphery of the table support member 224. At any time the scale 319 may be secured at its zero position with respect to scale 321 by means of clamp 323. Clamp 323 is caused to bear downwardly on the annular scale 319 by means of an elongated screw 325 supported on the table 226. A microscope 327 is mounted on the base member 220 in position so that the scales 319 and 321 may be read therethrough to within three seconds of one degree.

Hardened blocks 329 and 331 are mounted on either side of the base member 220 so as to project therefrom. Measurements may be taken between the blocks 329 and 331 and the surface on which the machine rests so as to determine that the machine is absolutely level before any checking operations are performed. It will thus be appreciated that the machine of this embodiment is relatively compact and designed so that the adjustments of the table and table support member may be accurately made, and with the use of two microscopes the relative positions of these members can be accurately determined at all times.

What is claimed is:

1. A checking fixture comprising a supporting base member having upwardly extending spaced apart arms which provide axially aligned bearings, a support member having coaxial trunnions journaled in said bearings, a worm wheel on one of said trunnions, a worm supported on one of said arms and arranged in mesh with said worm wheel, a shaft on said base for rotating said worm, motor means on said base for rotating said shaft, a hand wheel on the base for rotating the shaft to obtain small increments of movement of the support member, a first annular scale mounted on one of said trunnions, a second annular vernier scale mounted on said base member adjacent said first scale, a microscope mounted on said base member so as to view a portion of both the said scales for determining the relative angular positions of said base and said support member, a table rotatably supported on said support member, a shaft secured to said table and extending in one direction axially therefrom, a worm wheel on said table shaft, a shaft on said support member in the plane of and inclined with respect to said last mentioned worm wheel, a worm on said support member shaft arranged in mesh with said worm wheel on the table shaft, motor means connected to said inclined shaft for rotating the shaft, hand operable means on said inclined shaft for rotating the shaft to obtain small increments of movement of the table, a third annular scale mounted on said table adjacent said support member, a fourth annular scale mounted on said support member adjacent said third scale, a second microscope mounted on said support member so as to view a portion of said third and fourth scales for determining the relative angular positions of said table and support members, an undercut groove in one side of said table, a rod adjustably supported on the support member and having an enlarged head end disposed in said groove, said rod being adjustable in one direction such that said head end engages said table at said groove and retains the table against rotation, and switch means closable in response to movement of said rod in said one direction and connected in circuit with said last mentioned motor means for preventing actuation thereof when said rod is retaining the table against movement.

2. A checking fixture comprising a base member having upwardly extending, spaced apart arms, a drum-like supporting member trunnioned between said arms, a table rotatably mounted on one face of said supporting member, said table having two radially spaced concentric shoulders on the side thereof adjacent the supporting member, an annular scale mounted on the radial shoulder closest to said supporting member, a clamp having one portion bearing on said scale and another portion positioned opposite the other of said radial shoulders, said clamp being provided with a threaded aperture in said other portion thereof, a threaded rod member engageable with said clamp in the threaded aperture thereof and rotatably supported by said table, said rod-like member having an annular groove therein adapted to receive a pin whereby said rod-like member is permitted to rotate but is held against longitudinal movement for moving said clamp member toward or away from said scale, and tool engaging means at the end of said rod-like member whereby said rod-like member may be rotated to thread said clamp against said scale.

3. A checking fixture comprising a supporting base member having upwardly extending spaced apart arms which provide axially aligned bearings, a support member having coaxial trunnions journaled in said bearings, a worm wheel on one of said trunnions, a worm supported on one of said arms and arranged in mesh with said worm wheel, a shaft on said base for rotating said worm, motor means on said base for rotating said shaft, a hand wheel on the base for rotating the shaft to obtain small increments of movement of the support member, a first annular scale mounted on one of said trunnions, a second annular vernier scale mounted on said base member adjacent said first scale, a microscope mounted on said base member so as to view a portion of both the said scales for determining the relative angular positions of said base and said support member, a table rotatably supported on said support member, a shaft secured to said table and extending in one direction axially therefrom, a worm wheel on said table shaft, a shaft on said support member in the plane of and inclined with respect to said last mentioned worm wheel, a worm on said support member shaft arranged in mesh with said worm wheel on the table shaft, motor means connected to said inclined shaft for rotating the shaft, hand operable means on said inclined shaft for rotating the shaft to obtain small increments of movement of the table, a third annular scale mounted on said table adjacent said support member, a fourth annular scale mounted on said support member adjacent said third scale, a second microscope mounted on said support member so as to view a portion of said third and fourth scales for determining the relative angular positions of said table and support members, adjustable bolt means on said support member engageable with said table for releasably retaining said table against rotation on adjustment of said bolt means in one direction, switch contact means adjacent said bolt means closable in response to movement thereof in said one direction for preventing actuation of the motor for rotating the table when said bolt means including an adjustable threaded member is retaining said table against rotation, means supported on said base member and engageable with one of said trunnions for releasably retaining said support member against movement relative to said base member, and second switch contact means adjacent said threaded member closable in response to movement thereof in a direction to retain said support member against movement for preventing actuation of said support member motor means when said support member is retained against movement.

References Cited in the file of this patent

UNITED STATES PATENTS

| | | |
|---|---|---|
| 769,700 | Krawitzky | Sept. 13, 1904 |
| 854,050 | Marx | May 21, 1907 |
| 1,341,646 | Jesnig | June 1, 1920 |
| 1,775,952 | Turrettini | Sept. 16, 1930 |
| 1,806,683 | Roberts | May 26, 1931 |
| 1,858,624 | Hess | May 17, 1932 |
| 1,877,171 | Hallenbeck | Sept. 13, 1932 |
| 1,928,637 | Williams | Oct. 3, 1933 |
| 2,161,863 | Rusnak | June 6, 1939 |
| 2,380,664 | Miller | July 31, 1945 |
| 2,406,043 | Sorensen | Aug. 20, 1946 |
| 2,441,413 | Hassig | May 11, 1948 |
| 2,488,122 | Griffith | Nov. 15, 1949 |
| 2,498,314 | Tholl | Feb. 21, 1950 |
| 2,535,490 | Emrick | Dec. 26, 1950 |
| 2,537,269 | Harding | Jan. 9, 1951 |
| 2,538,640 | Click | Jan. 16, 1951 |
| 2,703,991 | Kron | Mar. 15, 1955 |

FOREIGN PATENTS

| | | |
|---|---|---|
| 408,394 | Great Britain | Apr. 12, 1934 |
| 869,786 | France | Feb. 16, 1942 |
| 895,479 | France | Jan. 25, 1945 |
| 277,075 | Switzerland | Nov. 16, 1951 |

UNITED STATES PATENT OFFICE
CERTIFICATION OF CORRECTION

Patent No. 2,999,319            September 12, 1961

Clarence Henry Miller

It is hereby certified that error appears in the above numbered patent requiring correction and that the said Letters Patent should read as corrected below.

Column 1, line 21, for "the" read -- a --; column 3, line 60, for "hase" read -- has --; column 5, line 54, for "tightent" read -- tighten --; column 10, line 10, strike out "including an adjustable threaded member" and insert the same after "means" in line 11, same column 10; same column 10, line 33, for "2,161,863" read -- 2,161,683 --.

Signed and sealed this 3rd day of April 1962.

(SEAL)
Attest:

ERNEST W. SWIDER
Attesting Officer

DAVID L. LADD
Commissioner of Patents